(12) United States Patent
Nozaki et al.

(10) Patent No.: US 11,220,418 B2
(45) Date of Patent: Jan. 11, 2022

(54) WEIGHING AND FILLING APPARATUS

(71) Applicants: Keio University, Tokyo (JP); SHIBUYA CORPORATION, Kanazawa (JP)

(72) Inventors: Takahiro Nozaki, Yokohama (JP); Kouhei Ohnishi, Yokohama (JP); Toshiaki Naka, Kanazawa (JP); Masato Ohta, Kanazawa (JP); Takaharu Kikura, Kanazawa (JP)

(73) Assignees: KEIO UNIVERSITY, Tokyo (JP); SHIBUYA CORPORATION, Kanazawa (JP)

( * ) Notice: Subject to any disclaimer, the term of this patent is extended or adjusted under 35 U.S.C. 154(b) by 0 days.

(21) Appl. No.: 17/053,492

(22) PCT Filed: Apr. 17, 2019

(86) PCT No.: PCT/JP2019/016499
§ 371 (c)(1),
(2) Date: Nov. 6, 2020

(87) PCT Pub. No.: WO2019/216144
PCT Pub. Date: Nov. 14, 2019

(65) Prior Publication Data
US 2021/0130146 A1 May 6, 2021

(51) Int. Cl.
*B67C 3/24* (2006.01)
*B67C 3/20* (2006.01)
(Continued)

(52) U.S. Cl.
CPC ............... *B67C 3/202* (2013.01); *B65B 3/28* (2013.01); *B67C 3/225* (2013.01); *G01B 21/08* (2013.01);
(Continued)

(58) Field of Classification Search
CPC ........... B67C 3/202; B67C 3/225; B65B 3/28; G01G 17/06; G01G 21/04; G01G 21/22;
(Continued)

(56) References Cited

U.S. PATENT DOCUMENTS 3,636,994 A * 1/1972 Lilljeforss .............. G01G 13/02
141/83
4,832,092 A * 5/1989 Hirose ...................... B65B 3/28
141/1
(Continued)

FOREIGN PATENT DOCUMENTS

JP 52-70681 A 6/1977
JP 57-61920 A 4/1982
(Continued)

OTHER PUBLICATIONS

International Search Report, with English translation, issued in corresponding International Application No. PCT/JP2019/016499, dated Jun. 18, 2019 (5 pages).
(Continued)

*Primary Examiner* — Nicolas A Arnett
(74) *Attorney, Agent, or Firm* — Flynn Thiel, P.C.

(57) ABSTRACT

Weighing and filling apparatus for controlling filling device based on a container weight. A linear actuator for driving a drive shaft coupled to container support unit is included, a weight measuring unit determines the container weight from a detected height of the drive shaft detected by a height detecting unit and a drive signal of the linear actuator at the detected height. A first acceleration signal is calculated from a specified height of the container support unit set in advance and the height detected by the height detecting unit, a second acceleration signal is calculated from the container weight and an expected weight expected to be applied to the container support unit. The container support unit is kept at
(Continued)

the specified height by a drive signal calculated from the first and second acceleration signals.

2 Claims, 3 Drawing Sheets

(51) Int. Cl.
| | |
|---|---|
| *B67C 3/22* | (2006.01) |
| *G01B 21/08* | (2006.01) |
| *G01G 7/00* | (2006.01) |
| *B65B 3/28* | (2006.01) |
| *G01G 21/22* | (2006.01) |
| *G01G 17/06* | (2006.01) |
| *G01G 23/14* | (2006.01) |
| *G01G 13/285* | (2006.01) |

(52) U.S. Cl.
CPC ............... *G01G 7/00* (2013.01); *G01G 17/06* (2013.01); *G01G 21/22* (2013.01); *G01G 13/285* (2013.01); *G01G 23/14* (2013.01)

(58) Field of Classification Search
CPC ........ G01G 21/08; G01G 7/00; G01G 13/285; G01G 23/14
See application file for complete search history.

(56) References Cited

U.S. PATENT DOCUMENTS

| | | | | |
|---|---|---|---|---|
| 4,836,293 A | * | 6/1989 | Gebo | G01G 7/02 177/1 |
| 5,038,839 A | * | 8/1991 | Morimoto | G01G 13/2943 141/83 |
| 5,423,216 A | * | 6/1995 | Kitamura | G01N 9/02 73/433 |
| 6,220,312 B1 | * | 4/2001 | Hirsch | G01G 3/125 141/83 |
| 6,399,901 B1 | * | 6/2002 | Nishino | B67C 3/242 177/52 |
| 7,941,291 B2 | * | 5/2011 | Chataigner | G01B 21/04 702/149 |
| 8,096,327 B2 | * | 1/2012 | Hirz | B65B 31/003 141/20 |
| 9,302,895 B2 | * | 4/2016 | Clusserath | B67C 3/22 |
| 9,739,656 B2 | * | 8/2017 | Kieser | G01G 11/16 |
| 2009/0078334 A1 | * | 3/2009 | Nufer | B65B 1/36 141/83 |
| 2014/0360621 A1 | * | 12/2014 | Clusserath | B65B 3/28 141/9 |

FOREIGN PATENT DOCUMENTS

| | | |
|---|---|---|
| JP | 63-55096 A | 3/1988 |
| JP | 64-45291 A | 2/1989 |
| JP | 3-502372 A | 5/1991 |
| JP | 5-3936 U | 1/1993 |
| JP | 2011-84323 A | 4/2011 |
| JP | 2013-230836 A | 11/2013 |

OTHER PUBLICATIONS

Written Opinion of International Searching Authority issued in corresponding International Application No. PCT/JP2019/016499, dated Jun. 18, 2019 (3 pages).

* cited by examiner

WEIGHING AND FILLING APPARATUS

TECHNICAL FIELD

The present invention relates to a weighing and filling apparatus, and more particularly, to a weighing and filling apparatus for performing filling of a filling material while measuring a weight of a container supported by container support unit by weight measuring unit.

BACKGROUND ART

Conventionally, there is known a weighing and filling apparatus including container support unit for supporting a container, weight measuring unit for measuring a weight of the container supported by each of the container support unit, filling device for supplying a filling material in the container supported by the container support unit, and controller for controlling the filling device based on a signal from the weight measuring unit (Patent Literature 1).

The weighing and filling apparatus according to Patent Literature 1 uses a strain gauge as the weight measuring unit, and measures a weight of a filling material by measuring deformation of the strain gauge.

Furthermore, a filling device for filling a container with a filling material generally uses a method of horizontally moving and transferring a container at the time of supplying and ejecting the container to and from the container support unit.

PRIOR ART DOCUMENTS

Patent Literature

Patent Literature 1
Japanese Patent Laid-Open No. 2013-230836

SUMMARY OF INVENTION

Problems to be Solved by the Invention

However, in the case where a strain gauge is used as the weight measuring unit, there is a problem that an accurate weight of a container cannot be measured immediately after the container is supported by the container support unit or immediately after completion of filling of the container with a filling material, until vibration of the strain gauge is attenuated.

Furthermore, in the case of horizontally moving and transferring the container to a supply side or an ejection side at the time of supplying or ejecting the container to or from the container support unit, if a height of the container support unit is variable, a trouble that the container gets caught at the time of transfer of the container may occur, for example.

In view of such a problem, the present invention provides a weighing and filling apparatus that is capable of swiftly measuring a container weight, and that is capable of preventing troubles occurring at the time of transfer of a container as much as possible.

Means for Solving the Problems

A weighing and filling apparatus according to an invention of claim 1 is a weighing and filling apparatus comprising container support unit for supporting a container, weight measuring unit for measuring a weight of the container supported by each of the container support unit, filling device for supplying a filling material into the container supported by the container support unit, and controller for controlling the filling device based on a container weight measured by the weight measuring unit, characterized in that:

the weighing and filling apparatus includes a drive shaft that is coupled to the container support unit, an actuator for driving the drive shaft, and height detecting unit for detecting a height of the container support unit;

the weight measuring unit determines the container weight from a height detected by the height detecting unit and a drive signal of the actuator at the detected height; and the controller
calculates a first acceleration signal from a specified height of the container support unit that is set in advance and the height detected by the height detecting unit, calculates a second acceleration signal from the container weight determined by the weight measuring unit and an expected weight that is expected to be applied to the container support unit, and calculates the drive signal for keeping the container support unit at the specified height, from the first acceleration signal and the second acceleration signal, and drives the actuator based on the drive signal.

An invention of claim 2 is the weighing and filling apparatus according to claim 1, characterized in that the actuator comprises the drive shaft that is a bar-shaped magnet fixed to a bottom surface of the container support unit, and a coil that surrounds the drive shaft and that generates magnetic force by the drive signal from the controller.

Advantageous Effects of Invention

According to the invention of claim 1, by driving the container support unit using the actuator, and calculating the container weight from the detected height of the container support unit and the drive signal of the actuator, a wait time as in Patent Literature 1 until vibration of the strain gauge is attenuated becomes unnecessary, and more swift measurement is enabled.

Furthermore, because the container support unit is kept at the specified height by driving the actuator, a height difference between the container support unit and a supply side and an ejection side may be eliminated at the time of supplying and ejecting the container to and from the container support unit, or a transferring side may be made slightly higher than a receiving side, so that the container is prevented from getting caught and occurrence of troubles at the time of transfer may be prevented.

Furthermore, according to the invention of claim 2, because the actuator comprises the drive shaft that is a bar-shaped magnet and the coil, measurement may be prevented from being affected by friction.

MODE FOR CARRYING OUT THE INVENTION

Figure 1:
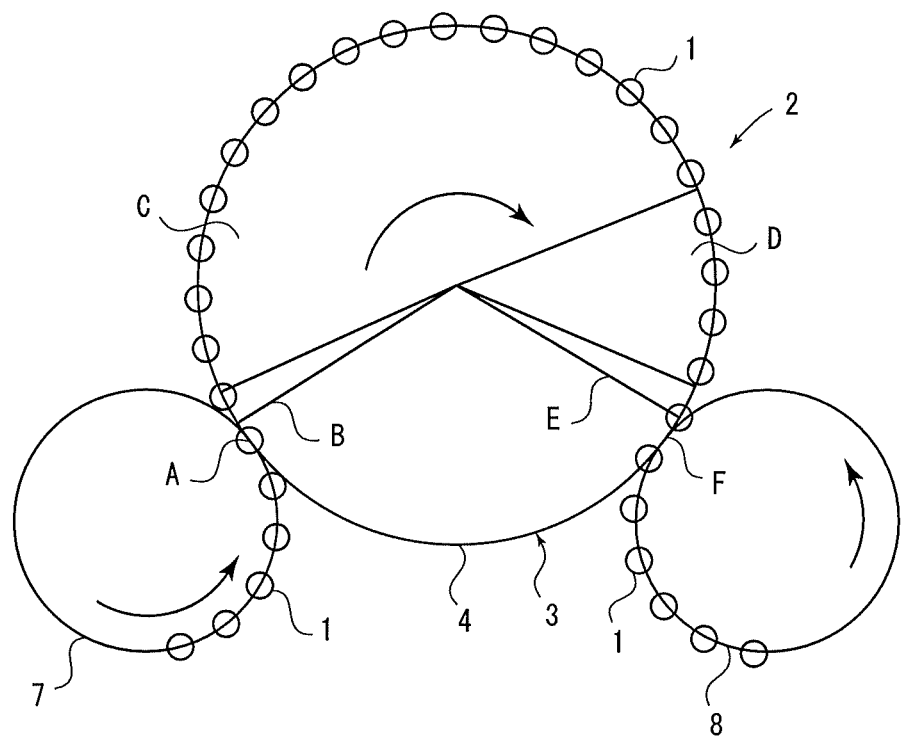
FIG. 1 is a plan view of a filling line according to a present embodiment.
Figure 2:
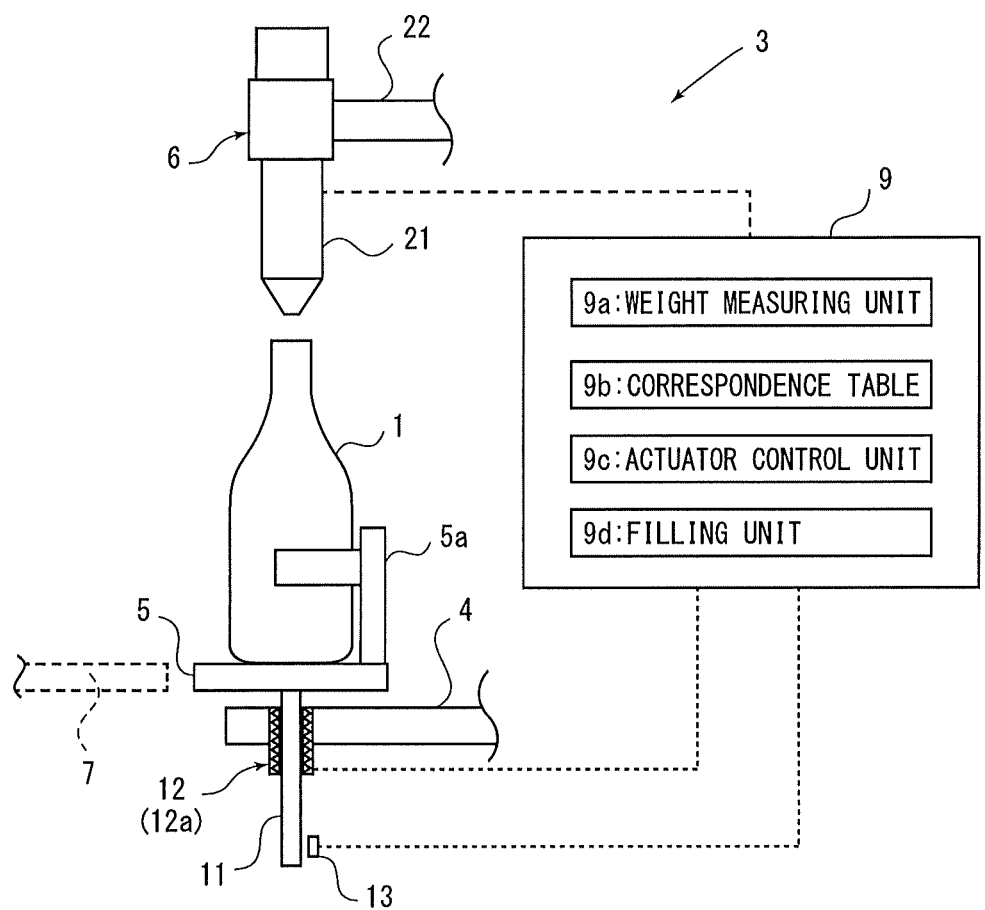
FIG. 2 is a cross-sectional view of a weighing and filling apparatus.

The present invention will be described in relation to embodiments shown in the drawings. FIG. 1 shows a filling line 2 for filling a container 1 such as a bottle with filling liquid, and FIG. 2 shows a cross-sectional view of a weighing and filling apparatus 3 for filling the container 1 with filling liquid.

The weighing and filling apparatus 3 includes a rotary table 4 that is rotatably provided, container support unit 5 provided at equal intervals along a circumferential direction of the rotary table 4, and filling device 6 for filling the containers 1 supported by the container support unit 5 with filling liquid, where filling is performed while the container 1 supported by the container support unit 5 and the filling device 6 are integrally rotated by rotation of the rotary table 4.

The filling line 2 includes a supply wheel 7 on an upstream side of the rotary table 4 and an ejection wheel 8 on a downstream side, and transfer of the container 1 is performed at a supply position A where the rotary table 4 and the supply wheel 7 are adjacent to each other and at an ejection position F where the rotary table 4 and the ejection wheel 8 are adjacent to each other.

The weighing and filling apparatus 3 operates under control of controller 9, and filling of the container 1 with the filling liquid is performed by causing the filling device 6 to operate between the supply position A and the ejection position F.

Specifically, in a large-throw section C set downstream of the supply position A, the filling device 6 fills the container 1 with the filling liquid at a high flow rate, and in a small-throw section D set downstream of the large-throw section C, the filling device 6 fills the container 1 with the filling liquid at a low flow rate.

Furthermore, at a measurement position B set downstream of the supply position A, the weight of an empty container 1 supplied at the supply position A is measured, and also, zero reset is performed to measure the weight of the filling liquid with which filling is to be performed.

Then, at a measurement position E set downstream of the small-throw section D, the weight of the filling liquid used for filling in the large-throw section C and the small-throw section D is measured.

The container support unit 5 supports the container 1 on an upper surface from below, and also supports the container 1 from a side by a support member 5a provided on an upper part of the container support unit 5.

At the supply position A at the supply wheel 7, the container 1 placed on the supply wheel 7 is horizontally moved and is transferred onto the container support unit 5, and at the ejection position F at the ejection wheel 8, the container 1 placed on the container support unit 5 is also horizontally moved and is transferred to the ejection wheel 8.

At this time, if there is a height difference between the upper surface of the container support unit 5 and upper surfaces of the supply wheel 7 and the ejection wheel 8, a trouble such as a knocked-over bottle may occur at the time of transfer of the container 1, and thus, the height of the upper surface of the container support unit 5 desirably matches the upper surfaces of the supply wheel 7 and the ejection wheel 8.

A drive shaft 11 that is a round bar-shaped or square bar-shaped magnet fixed to a bottom surface of the container support unit 5 is provided on a lower portion of the container support unit 5, and a linear actuator 12 comprising a coil 12a that surrounds the drive shaft 11 and that generates magnetic force by a drive signal from the controller 9 is provided on the rotary table 4.

Description of specific structure and operation of the linear actuator 12 will be omitted, but the drive shaft 11 may be driven by applying a current, as the drive signal, to the coil 12a, and in the present embodiment, the drive force is used to keep the container support unit 5 and the container 1 placed on the container support unit 5 at a constant position.

The drive shaft 11 is provided protruding downward from the coil 12a, and the rotary table 4 is provided with height detecting unit 13 for detecting the position of the drive shaft 11, and for transmitting a detected height to the controller 9.

As the height detecting unit 13, a sensor that is capable of detecting the height of the container support unit 5 with high accuracy, and that has a high sampling frequency is desirably used.

The controller 9 includes a weight measuring unit 9a, and a weight that is applied to the container support unit 5 is measured from the drive signal from the linear actuator 12 and the detected height detected by the height detecting unit 13.

Furthermore, results of measuring the drive signal for driving the linear actuator 12 in cases where heights of the container support unit 5 and weights applied to the container support unit 5 are varied are registered in the controller 9 as a correspondence table 9b.

Accordingly, when the detected height of the container support unit 5 that is detected by the height detecting unit 13 and the drive signal for driving the linear actuator 12 at the time are known, the weight measuring unit 9a is able to obtain the weight that is applied to the container support unit 5, or in other words, a container weight, from the correspondence table 9b.

Additionally, in the following description, the container weight may include a result of measuring the weight of the container support unit 5 itself in a state where the container 1 is not placed on the container support unit 5.

Figure 3:
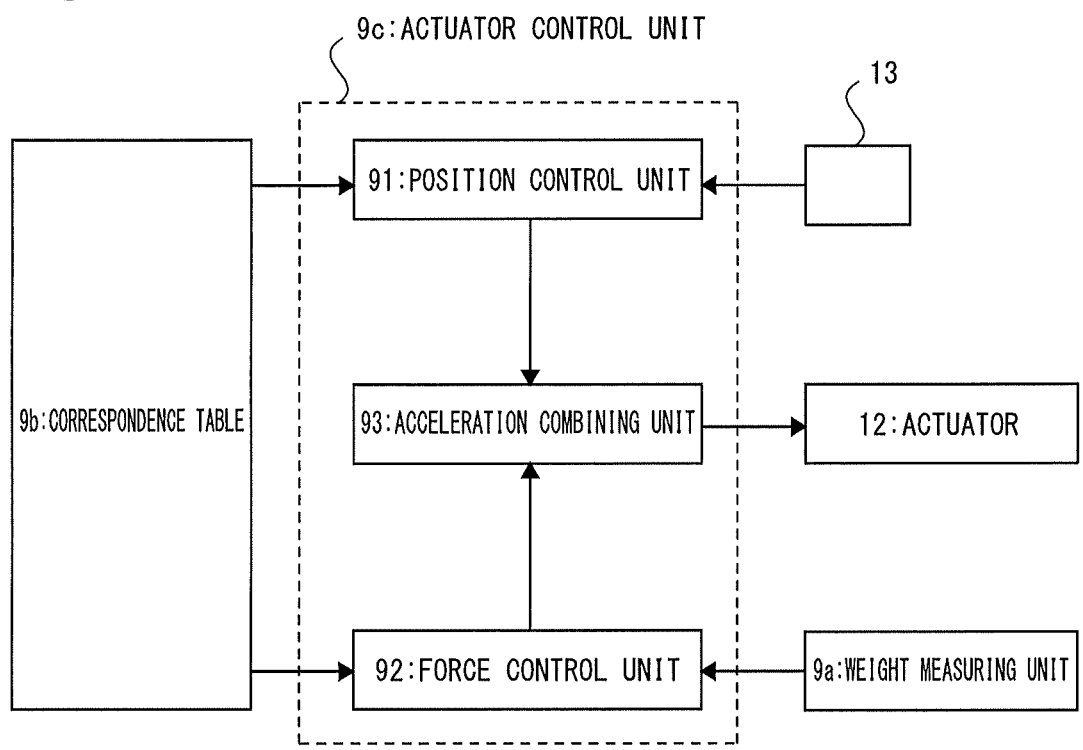
FIG. 3 is a structural diagram of an actuator control unit.

Moreover, the controller 9 includes an actuator control unit 9c for controlling the linear actuator 12, and as shown in FIG. 3, the actuator control unit 9c may be expressed as a control rule including a position control unit 91, a force control unit 92, and an acceleration combining unit 93.

Furthermore, the actuator control unit 9c controls the linear actuator 12, and thereby keeps the container support unit 5 at a specified height regardless of the container weight that is applied to the container support unit 5.

The specified height in the present embodiment is a height that is registered in advance in the correspondence table 9b and is, more specifically, a height at which the upper surface of the container support unit 5 matches a height of the upper surfaces of the supply wheel 7 and the ejection wheel 8, and a constant specified height may be set from the supply position A to the ejection position F.

The position control unit 91 calculates a first acceleration signal from the specified height of the container support unit 5 registered in the correspondence table 9b and the detected height of the container support unit 5 detected by the height detecting unit 13.

In a state where there is no change in the weight applied to the container support unit 5, such as at the measurement positions B, E, for example, the container support unit 5 is kept at the specified height by the linear actuator 12, and thus, there is no difference between the detected height and the specified height, and the first acceleration signal is zero.

On the other hand, in a state where the container 1 is being placed on the container support unit 5 or the container 1 is being filled with filling liquid, such as at the supply position A or in the large-throw section C, for example, the container 1 cannot be maintained at a constant position by the drive force from the drive signal for driving the linear actuator 12 until an immediately preceding time point, and the container support unit 5 is slightly lowered, and thus, a difference occurs between the detected height and the specified height, and the first acceleration signal is caused.

Next, the force control unit 92 calculates a second acceleration signal from the container weight calculated by the weight measuring unit 9a and an expected weight that is expected to be applied to the container support unit 5.

An encoder, not shown, is provided at the rotary table 4, and the position of each container support unit 5 is grasped by the controller 9. Furthermore, the expected weight to be applied to the container support unit 5 at each position of the container support unit 5 is registered in the correspondence table 9b of the controller 9.

Specifically, the expected weight at the measurement position B corresponds to the weight of an empty container 1, and the expected weight in the large-throw section C or the small-throw section D corresponds to the weight of the container 1 that is filled with the filling liquid as the container support unit 5 moves, and the expected weight at the measurement position E corresponds to the weight of the container 1 that is the empty container 1 that is now filled with a specified amount of filling liquid.

The second acceleration signal is calculated from the actual container weight calculated by the weight measuring unit 9a and the expected weight that is registered in the correspondence table 9b in association with the position of the container support unit 5.

For example, if there is no difference between the actual container weight and the expected weight when the container 1 is placed on the container support unit 5 at the supply position A, the second acceleration signal is zero. On the other hand, in the case where the container 1 is not filled with an expected amount of filling liquid at a predetermined position in the small-thrown section D, for example, a difference occurs between the actual container weight and the expected weight, and the second acceleration signal is caused.

Then, the acceleration combining unit 93 calculates the drive signal for the linear actuator 12 from the first acceleration signal and the second acceleration signal that are obtained, and drives the linear actuator 12 based on the drive signal.

The drive signal that is calculated keeps the container support unit 5 at the specified height regardless of the weight that is applied to the container support unit 5, and the specified height may be maintained from the supply position A to the ejection position F by constantly calculating the drive signal.

The filling device 6 includes a filling nozzle 21 that is provided above the container 1 placed on the container support unit 5, and a liquid feed pipe 22 that is disposed between a filling liquid tank, not shown, and the filling nozzle 21.

A valve, not shown, is provided inside the filling nozzle 21, and the filling nozzle 21 is controlled by a filling unit 9d provided at the controller 9. The filling unit 9d controls the degree of opening of the valve of the filling nozzle 21 in the large-throw section C and the small-throw section D based on the weight of the container 1 measured by the weight measuring unit 9a, and performs filling of the filling liquid.

At this time, the filling liquid is supplied at a high flow rate in the large-throw section C to fill a large portion of the container 1, and the remaining portion is accurately filled in the small-throw section D at a low flow rate.

The filling unit 9b monitors the weight of the container 1 measured by the weight measuring unit 9a, and when it is concluded that the container 1 is filled with a specified amount of filling liquid, the valve in the filling nozzle 21 is closed and filling of the filling liquid is ended.

Operation of the filling line 2 configured in the above manner will be described. First, an empty container 1 is carried by the supply wheel 7, and the container 1 is transferred from the supply wheel 7 to the rotary table 4 at the supply position A adjacent to the rotary table 4.

At this time, the container support unit 5 that is positioned at the supply position A of the rotary table 4 is positioned at the specified height by the linear actuator 12, and the container 1 is horizontally moved in this state from the supply wheel 7 to be placed on the container support unit 5.

As a result, the weight of the empty container 1 is applied to the container support unit 5, and the container support unit 5 is slightly lowered due to the linear actuator 12 not being able to keep the container support unit 5 at the specified height with the drive signal up to the time point.

The height detecting unit 13 constantly detects the height of the drive shaft 11 of the linear actuator 12, and the weight measuring unit 9a grasps, using the correspondence table 9b, the container weight that is applied to the container support unit 5, from the detected height of the container support unit 5 that is lowered due to placement of the container 1 and the drive signal of the linear actuator 12 at the time, or in other words, the drive signal that drove the linear actuator 12 until before placement of the container 1 immediately.

Next, the actuator control unit 9c of the controller 9 determines the first acceleration signal from the height detected by the height detecting unit 13 and a specified height that is set in advance, determines the second acceleration signal from the container weight determined by the weight measuring unit 9a and the expected weight at the supply position A retrieved from the correspondence table 9b, and calculates the drive signal by adding up the first and second acceleration signals.

Then, the actuator control unit 9c drives the linear actuator 12 by the calculated drive signal, and the container support unit 5 on which an empty container 1 is placed is thereby moved to the specified height.

Furthermore, the filling unit 9d settles on the weight of the empty container 1 measured by the weight measuring unit 9a while the container support unit 5 moves through the measurement position B, and resets the weight to zero for starting to filling of the filling liquid.

The operation of height detection and weight detection is constantly performed regardless of whether a container 1 is placed on the container support unit 5 or not, and also, by increasing the sampling frequency, measurement of the weight of the container 1 placed on the container support unit 5 may be swiftly performed. In other words, a space between the supply position A and the measurement position B and a space between the ejection position F and the measurement position E that are set on the rotary table 4 for measurement of the weight of the container 1 may be set small.

In contrast, the weighing and filling apparatus 3 described in Patent Literature 1 uses a Roberval-type strain gauge for measurement of the weight of the container 1, and the weight of the container 1 cannot be accurately measured until Roberval vibration is attenuated, and thus, measurement of the weight cannot be performed immediately after the container 1 is supplied or immediately after completion of filling, and a space up to the position of measurement of the weight has to be set long.

In the case where the space up to the position of measurement is set long for a weighing and filling apparatus having the same processing capacity, the diameter of the rotary table 4 has be to increased, and there is a problem that an installation space for equipment has to be increased.

On the other hand, in the case where the diameter of the rotary table 4 is the same, a length of a filling section has to be set short to the extent that the space up to the position of measurement is set long, and thus, the processing capacity is reduced because the rotary table 4 has to be rotated at a low speed.

Furthermore, in the case of the Roberval-type strain gauge, Roberval deformation that is caused by centrifugal force due to rotation of the rotary table 4 has to be taken into account; however, by providing the drive shaft 11 of the linear actuator 12 in a manner capable of moving up and down relative to the coil 12a, as in the present embodiment, effect of centrifugal force that is applied to the container support unit 5 may be eliminated, and correction of an error due to the centrifugal force at the time of measurement of the weight of the container 1 becomes unnecessary.

When the container support unit 5 supporting the empty container 1 enters the large-throw section C from the measurement position B, the filling unit 9d of the controller 9 opens the valve of the filling nozzle 21 of the filling device 6, and filling of the container 1 with the filling liquid is started.

In the large-throw section C, the container 1 is filled with the filling liquid at a high flow rate and a large portion of the volume of the container 1 is filled, and then, in the small-throw section D, the container 1 is filled with the filling liquid at a low flow rate while measuring the weight of the filling liquid measured by the weight measuring unit 9a. Additionally, it is also possible to omit the small-throw section D.

Then, when the container 1 is filled with a specified amount of filling liquid, the filling unit 9d closes the valve of the filling nozzle 21, and filling of the filling liquid is ended.

When the container 1 is filled with the filling liquid in the large-throw section C or the small-throw section D, the weight that is applied to the container support unit 5 is increased due to filling of the filling liquid, and the container support unit 5 will be lowered.

The expected weight based on the amount of filling of the filling liquid at each position of the rotary table 4 is registered in the correspondence table 9b of the controller 9, and the actuator control unit 9c calculates the second acceleration signal from the container weight determined by the weight measuring unit 9a and the expected weight of the container 1 at each position.

Furthermore, the actuator control unit 9c calculates the drive signal from the first acceleration signal determined from the detected height detected by the height detecting unit 13 and the specified height and the second acceleration signal that is calculated, drives the linear actuator 12, and keeps the container support unit 5 at the specified height.

Then, when the container 1 moves from the small-throw section D to the measurement position E, the weight of the filling liquid filling the container 1 is measured at the measurement position E.

Also at this time, the actuator control unit 9c keeps the container support unit 5 at the specified height, and the container 1 may be transferred to the ejection wheel 8 by horizontally moving the container 1 at the ejection position F.

Here, in the case of a conventional configuration using the Roberval-type strain gauge, the position of the container 1 is lowered according to an increase in the weight of the container 1, and thus, the height of the container support unit 5 at the ejection position F is lower than the height of the container support unit 5 at the supply position A.

Accordingly, conventionally, adjustment has to be performed to set the height of the ejection wheel 8 lower than the height of the supply wheel 7, for example, and there is a problem that adjustment at the filling line 2 is complicated.

In the above-described embodiment, a case is described where a container is filled with filling liquid, but the filling material is not limited to liquid and may be powder, a solid material or the like, and the container may be a bottle, a bag, a box or the like, without being limited to the embodiment.

Furthermore, in the above-described embodiment, the container 1 is supported on the upper surface of the container support unit 5, but a neck gripper that carries the container 1 by gripping a neck portion may be used as the container support unit.

Also in this case, providing the neck gripper with the drive shaft 11 and the linear actuator 12 enables the container weight to be swiftly measured, and the neck gripper to be kept at a constant specified height, and transfer between the supply side and the ejection side may be smoothly performed.

Moreover, the above-described embodiment describes a rotary-type gravimetric filling device including a rotary table, but application to a line-type gravimetric filling device that performs processing by linearly carrying the containers 1 is also possible without being limited to the rotary type.

Furthermore, in the above-described embodiment, the specified height of the container support unit 5 is set constant, but the height does not necessarily have to be constant, and the specified height at the supply position A at the supply wheel 7 may be made slightly lower than the height of the upper surface of the supply wheel 7. This may prevent the container 1 from getting caught at the time of being moved from the supply wheel 7 to the container support unit 5.

In contrast, by making the specified height at the ejection position F at the ejection wheel 8 slightly higher than the height of the upper surface of the ejection wheel 8, the container 1 may be prevented from getting caught at the time of being moved to the ejection wheel 8.

Figure 4:
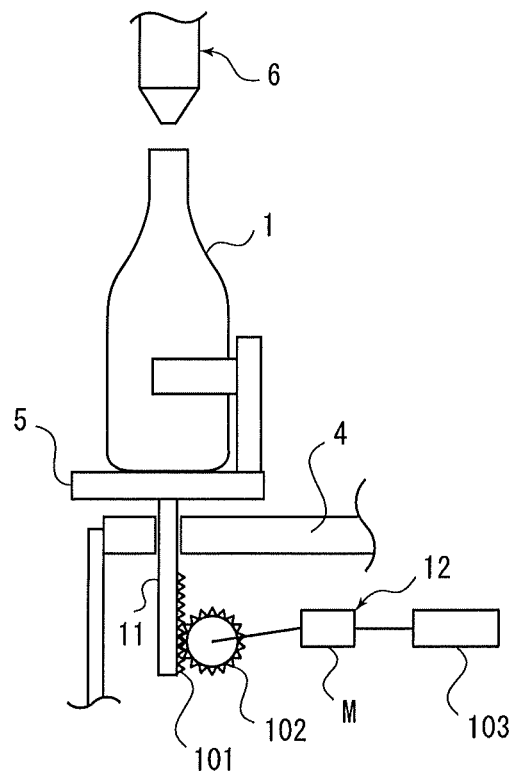
FIG. 4 is a cross-sectional view of a weighing and filling apparatus according to another embodiment.

Moreover, in the above-described embodiment, the linear actuator 12 comprising the drive shaft 11, that is a magnet, and the coil 12a is used, but one that comprises a rack 101 provided on the drive shaft 11 and a pinion 102 that is driven by a motor M, as shown in FIG. 4, may also be used as the actuator.

In this case, an encoder 103 provided at the motor M may be used as the height detecting unit 13.

REFERENCE SIGNS LIST 1 container
2 filling line
3 weighing and filling apparatus
4 rotary table
5 container support unit
6 filling device
9 controller
9a weight measuring unit 9b correspondence table
9c actuator control unit
9d filling unit
11 drive shaft
12 linear actuator (actuator)
13 height detecting unit
91 position control unit
92 force control unit
93 acceleration combining unit

The invention claimed is:

1. A weighing and filling apparatus comprising a container support unit for supporting a container, a weight measuring unit for measuring a weight of the container supported by the container support unit, a filling device for supplying a filling material into the container supported by the container support unit, and a controller for controlling the filling device based on a container weight measured by the weight measuring unit, wherein:

the weighing and filling apparatus includes a drive shaft that is coupled to the container support unit, an actuator for driving the drive shaft, and a height detecting unit for detecting a height of the container support unit;

the weight measuring unit determines the container weight from a detected height detected by the height detecting unit and a drive signal of the actuator at the detected height; and the controller:
calculates a first acceleration signal from a specified height of the container support unit that is set in advance and the detected height detected by the height detecting unit;

calculates a second acceleration signal from the container weight determined by the weight measuring unit and an expected weight that is expected to be applied to the container support unit; and calculates the drive signal for keeping the container support unit at the specified height, from the first acceleration signal and the second acceleration signal, and drives the actuator based on the drive signal.

2. The weighing and filling apparatus according to claim 1, wherein the actuator comprises the drive shaft that is a bar-shaped magnet fixed to a bottom surface of the container support unit, and a coil that surrounds the drive shaft and that generates a magnetic force by the drive signal from the controller.

* * * * *

UNITED STATES PATENT AND TRADEMARK OFFICE
CERTIFICATE OF CORRECTION

PATENT NO. : 11,220,418 B2
APPLICATION NO. : 17/053492
DATED : January 11, 2022
INVENTOR(S) : Takahiro Nozaki et al.

It is certified that error appears in the above-identified patent and that said Letters Patent is hereby corrected as shown below:

On the Title Page

Add item (30), as follows:
---(30) Foreign Application Priority Data
May 9, 2018 (JP).............JP2018-090897---

Signed and Sealed this
Eighth Day of March, 2022

Drew Hirshfeld
*Performing the Functions and Duties of the
Under Secretary of Commerce for Intellectual Property and
Director of the United States Patent and Trademark Office*